(12) United States Patent
Pollard

(10) Patent No.: US 7,255,179 B2
(45) Date of Patent: Aug. 14, 2007

(54) CULTIVATOR SWEEP ASSEMBLY

(76) Inventor: Lorne R. Pollard, 800 W. Fifth Ave., Suite 101H, Naperville, Will County, IL (US) 60563

( * ) Notice: Subject to any disclaimer, the term of this patent is extended or adjusted under 35 U.S.C. 154(b) by 0 days.

(21) Appl. No.: 11/638,811

(22) Filed: Dec. 14, 2006

(65) Prior Publication Data
US 2007/0089889 A1 Apr. 26, 2007

Related U.S. Application Data

(63) Continuation-in-part of application No. 10/865,536, filed on Jun. 9, 2004, now abandoned.

(60) Provisional application No. 60/476,442, filed on Jun. 9, 2003.

(51) Int. Cl.
| A01B 15/00 | (2006.01) |
| A01B 23/00 | (2006.01) |
| A01B 31/00 | (2006.01) |
| A01B 25/20 | (2006.01) |
| A01B 39/20 | (2006.01) |

(52) U.S. Cl. ............ 172/683; 172/750; 172/753; 172/762; 172/772.5; 403/314; 403/322.1; 403/324; 403/325; 403/326; 403/374.1; 403/375; 403/409.1

(58) Field of Classification Search ........ 172/763, 172/762, 772, 772.5, 753, 750, 749, 683, 172/681; 403/314, 322.1, 324–326, 374.1, 403/375, 409.1
See application file for complete search history.

(56) References Cited

U.S. PATENT DOCUMENTS

| 5,373,936 | A | * | 12/1994 | Kawai et al. | 206/204 |
| 5,558,451 | A | * | 9/1996 | Hanabusa et al. | 400/637 |
| 6,003,985 | A | * | 12/1999 | Bekki | 347/86 |
| 6,033,067 | A | * | 3/2000 | Kakizaki et al. | 347/104 |
| 6,097,407 | A | * | 8/2000 | Terasawa et al. | 347/31 |
| 6,170,945 | B1 | * | 1/2001 | Matsui et al. | 347/108 |
| 6,190,010 | B1 | * | 2/2001 | Tanaka | 347/108 |
| 6,289,996 | B1 | * | 9/2001 | Parish | 172/730 |
| 6,390,612 | B1 | * | 5/2002 | Kotaki et al. | 347/85 |
| 6,571,884 | B1 | * | 6/2003 | Horvath et al. | 172/730 |
| 6,585,058 | B2 | * | 7/2003 | Zaun et al. | 172/762 |
| 6,684,963 | B1 | * | 2/2004 | Poutre et al. | 172/750 |
| 6,814,151 | B1 | * | 11/2004 | Peck et al. | 172/750 |

* cited by examiner

*Primary Examiner*—Christopher J. Novosad
(74) *Attorney, Agent, or Firm*—Gary K. Price, Esq.

(57) ABSTRACT

A cultivator sweep assembly having a sweep adapted for releasable attachment to a shank of a mobile agricultural apparatus. The sweep assembly includes a sweep having a more narrow profile, and a coupling attached to a tapered end portion of the shank and disposed between the sweep and the supporting shank. The sweep includes a stem portion that defines a housing configured to frictionally receive and engage the tapered end portion of the shank. The end portion of the shank having the coupling attached thereto is slidably received within the housing until a projection of the coupling is received through a top opening of the housing. The projection received through the top opening indicating that the end portion of the shank is sufficiently received within the housing of the sweep, and that the sweep is mounted to the shank with sufficient force.

14 Claims, 4 Drawing Sheets

CULTIVATOR SWEEP ASSEMBLY

CROSS REFERENCES TO RELATED APPLICATIONS

U.S. Provisional Application for Pat. No. 60/476,442, filed Jun. 9, 2003, with title "Agricultural Sweep and Connection Therefor" which is hereby incorporated by reference. Applicant claims priority pursuant to 35 U.S.C. Par. 119(e) (i). This application is also a Continuation-In-Part of U.S. patent application Ser. No. 10/865,536 now abandoned, filed Jun. 9, 2004.

Statement as to rights to inventions made under federally sponsored research and development: Not Applicable

BACKGROUND OF THE INVENTION

1. Field of the Invention

The present invention relates generally to agricultural tools, and in particular, to a cultivator sweep having an improved narrow design for enhancing operation of the sweep, and a coupling or attachment between the sweep and a supporting shank.

2. Brief Description of Prior Art

It is conventional to provide field cultivator sweeps that are drawn through the soil for the purpose of loosening earth for seeding, and to kill weeds which otherwise might rob the soil of valuable moisture and nutrients.

A well known form of cultivator sweep has a generally V-shape configuration with a nose portion including a forwardmost ground penetrating point and a pair of wing portions which diverge outwardly and rearwardly from said point. During operation, the cultivator sweep is normally disposed about 3 inches to about 6 inches below the top surface of the soil.

Standard assemblies for cultivator sweeps typically include an upright shank connected at its upper end and extending downwardly to a receiving portion of the sweep. The shank being generally attached to a mobile agricultural apparatus. Available mounting means for attaching the shank to the sweep include bolts extending through aligned holes in the sweep and the shank. Another known mounting structure includes the use of a tapered adapter brackets fastened to the end of a self-locking fit with a taper on the sweeps. However problems associated with such assemblies include loss of sweeps during transport if the tapers do not match correctly or if the sweep is not mounted with sufficient force.

In many of the shank assemblies that have a quick attaching feature for mounting the sweep on the shank, a relatively wide profile is presented along the shank and at the mounting location of the sweep. Such a profile generally results in unwanted residue disturbance and higher draft loads.

As will be seen from the subsequent description, the preferred embodiments of the present invention overcome shortcomings of the prior art.

SUMMARY OF THE INVENTION

The present invention is a cultivator sweep which is adapted for releasable attachment to a shank of a mobile agricultural apparatus. The sweep having a more narrow profile than prior art sweeps, and a coupling or attachment disposed between the sweep and a supporting shank provides an easily attachable and removable sweep to the shank. The sweep includes an earth engaging head portion formed integrally with a stem portion. The stem portion defines a housing having an opening on one end, and includes opposed side walls and a surface. The housing of the stem portion is shaped and proportioned to closely receive and engage a tapered end portion of the shank.

The present invention further includes a coupling attached to the end portion of the shank. The end portion of the shank having the coupling appropriately attached thereto, is slidably received within the housing of the stem portion of the sweep until a projected portion of the coupling is received in a slot disposed in the surface of the housing. The projection portion received in the slot indicating that the end portion of the shank is sufficiently received within the housing of the stem portion of the sweep, and that the sweep is mounted to the shank with sufficient force.

DESCRIPTION OF THE PREFERRED EMBODIMENT

Figure 1:
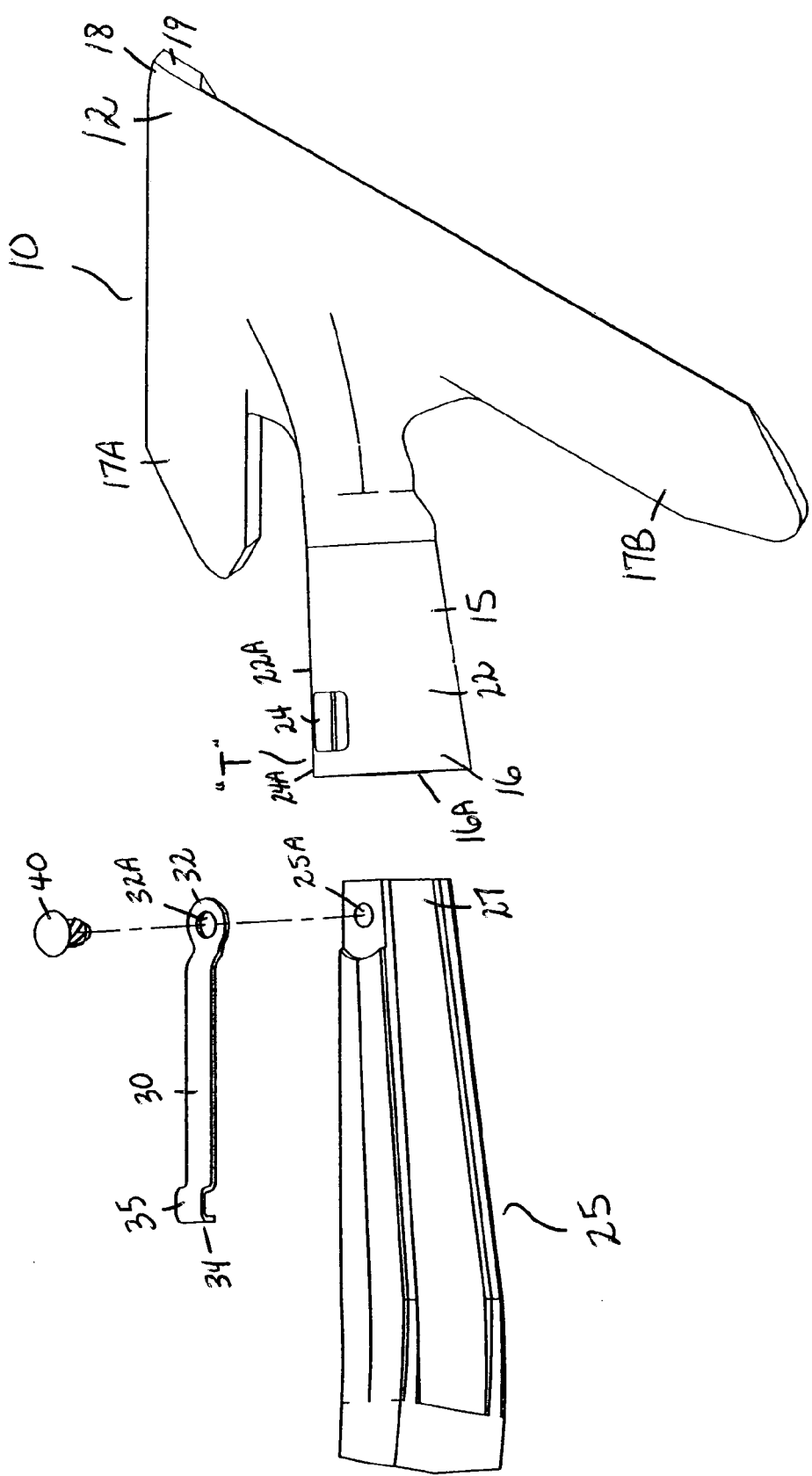
FIG. 1 is an exploded perspective view of a cultivator sweep assembly according to a preferred embodiment of the present invention.

In accordance with the present invention, a cultivator sweep assembly is disclosed. During use, the sweep of the sweep assembly is drawn through the soil by a mobile agricultural apparatus for the purpose of loosening earth for seeding, and to kill weeds which otherwise might rob the soil of valuable moisture and nutrients.

The sweep having a more narrow profile than prior art sweeps for less residue disturbance and lower draft loads. The present invention further includes a coupling or attachment to mount the sweep to a supporting shank of the mobile agricultural apparatus. The coupling or attachment provides an easily attachable and removable sweep to the shank.

Specifically, it will be noted in the drawings that the cultivator sweep assembly relates to a cultivating tool having a more narrow profile, and to a structure for preventing the sweep from falling off the shank. In the broadest context, the sweep assembly consists of components configured and correlated with respect to each other so as to attain the desired objective.

Figure 2:
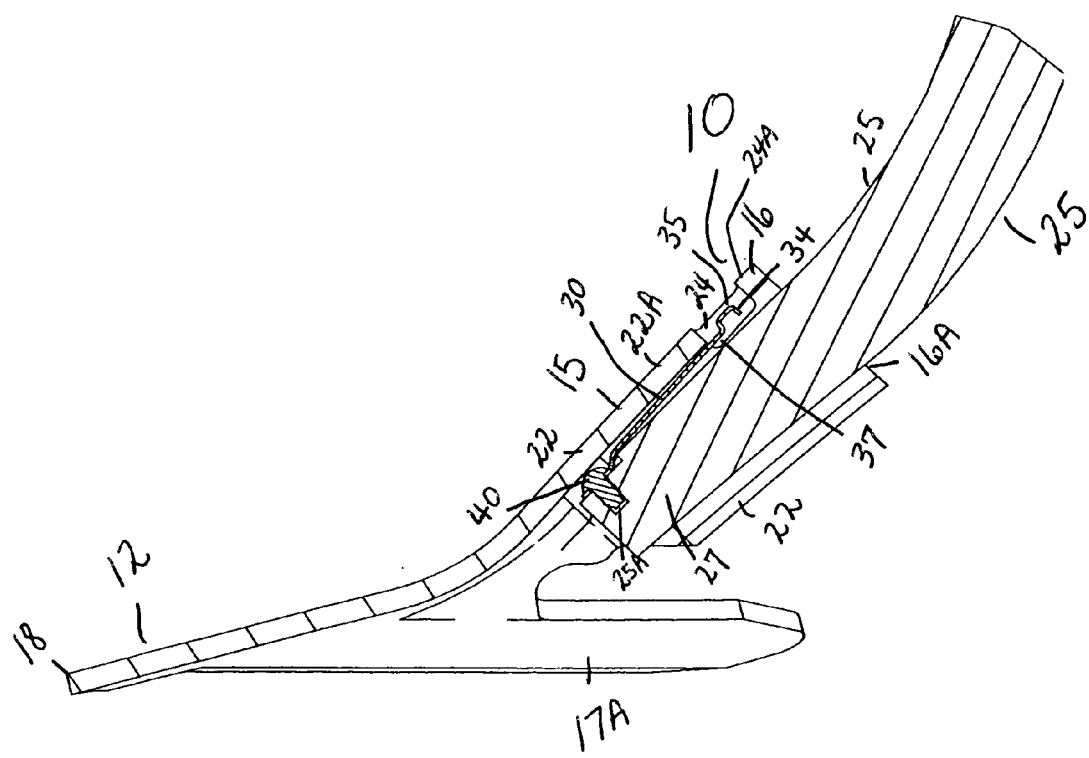
FIG. 2 is a sectional view of the cultivator sweep assembly of FIG. 1.

FIGS. 1-2 illustrate a preferred embodiment of a cultivator sweep assembly made in accordance of the present invention. As will be described, the sweep of the sweep assembly having a more narrow profile than prior art sweeps, and the coupling or attachment disposed between the sweep and supporting shank provides an easily attachable and removable sweep to the shank.

Referring to FIGS. 1-2, is disclosed a sweep 10 adapted for releasable attachment to a shank 25 of a mobile agricultural apparatus (not shown). The sweep 10 includes an earth engaging head portion 12 formed integrally with a stem portion 15. The head portion 12 having a generally triangular planar configuration with a generally concave cross-sectional configuration. The head portion 12 further having a pair of substantially identical wings 17A and 17B symmetrically extending rearwardly from a nose portion 18 of the head portion 12, which nose region 18 includes a forwardmost ground penetrating point 19.

The top end of the stem portion of prior art sweeps generally have a width of approximately 2⅝ inches. The top end (designated as "T" in FIG. 1) of the stem portion 15 having a narrower width of approximately 1¼ inches. This narrow profile of the stem portion 15:

(1) reduces buildup of residue around the shank and sweep;
(2) pulls easier with less horsepower required;
(3) throws less dirt allowing higher operating speeds;
(4) throws less dirt leaving level fields that requires less harrowing.

As best shown in FIG. 2, the stem portion 15 defines a housing 16 having an opening 16A on one end and further includes opposing side walls 22 and a surface 22A that defines a slot 24 and a barrier 24A.

The housing 16 of the stem portion 15 is shaped and proportioned to closely receive and engage a tapered end portion 27 of the shank 25 as will be further described.

The retaining means for holding the sweep 10 to the shank 25 includes a coupling 30 attached to the end portion 27 of the shank 25. In general, the end portion 27 of the shank 25, having the coupling 30 appropriately attached thereto, is received within the housing 16 of the stem portion 15 of the sweep 10. The end portion 27 of the shank 25 is slidably received within the housing 16 of the stem portion 25 until a projection portion 35 of the coupling 30 passes the barrier 24A and is received through the slot 24 of the surface 22A of the housing 16. The projection portion 35 received through the slot 24 indicating that end portion 27 of the shank 25 is sufficiently received within the housing 16 of the stem portion 15 of the sweep 10, and that the sweep 10 is mounted to the shank 25 with sufficient force.

Referring to FIG. 1, the coupling 30 having a first end 32 and a second end 34 opposite the first end 32. The second end 34 defining the projection portion 35. The first end 32 including attaching means in order to appropriately attach the coupling 30 to the end portion 27 of the shank 25. In the preferred embodiment, the first end 32 includes an end hole 32A that in application is aligned with a threaded hole 25A of the end portion 27 of the shank 25 for receipt of a threaded screw 40 through the holes 25A, 32A. When attached as shown in FIG. 2, the coupling 30 is in parallel, abutting relationship with the end portion 27 of the shank 25 and the projection portion 35 of the coupling 30 is disposed distally from the second hole 25A of the end portion 27.

In a first position, a spacing 37 (shown in FIG. 2) is defined between the second end 34 of the coupling 30 and the outer surface of the shank 25. In application, the coupling 30 can be pressed to a second position so that the second end 34 is contiguous with the outer surface of the shank 25. In the second position, the end portion 27 can be received within the housing 16 of the stem portion 15. Once the projection portion 35 of the coupling 30 is received through the slot 24 as discussed, the coupling 30 returns to its first position, as shown in FIG. 2. In this regard, the projection portion 35 is retained within the perimeter of the slot 24 thereby retaining the shank 25 within the housing 16 and preventing the sweep 10 from sliding downwardly off the shank 25 during application.

The sweep 10 is held on to the shank 25 by the frictional engagement between the tapered end portion 27 of the shank 25 and the housing 16 of the stem portion 15 of the sweep 10. As previously described, the sweep 10 is secondarily held on to the shank 25 as the projection portion 35 of the coupling 30 is received through the slot 24 of the surface 22A of the housing 16. The projection portion 35 received through the slot 24 indicating that end portion 27 of the shank 25 is sufficiently received within the housing 16 of the stem portion 15 of the sweep 10, and that the sweep 10 is mounted to the shank 25 with sufficient force.

To attach the sweep 10, the end portion 27 of the shank 25, having the coupling 30 attached thereto as discussed above, is slid inwardly into the housing 16 of the stem portion 15 until the projection portion 35 of the coupling 30 is received through the slot 24 of the stem portion 15. Surfaces of the sweep 10 opposite the housing 16, such as the nose region 18 can be struck by a hammer to urge the end portion 27 of the shank 25 within the housing 16 of the stem portion 15, if necessary. The projection portion 35 received through the slot 24 indicates that end portion 27 of the shank 25 is sufficiently received within the housing 16 of the stem portion 15 of the sweep 10, and that the sweep 10 is mounted to the shank 25 with sufficient force. Once the sweep 10 engages the soil, the self-locking fit as discussed above is further provided and enhanced.

To remove the sweep 10, the projection portion 35 of the coupling 30 is pressed downward so that the coupling 30 is in the second position as discussed above.

Once the coupling 30 is in the second position, the end portion 27 of the shank 25 is slid outwardly from the housing 16 of the stem portion 15 thereby removing the sweep 10 from the shank 25.

Figure 3:
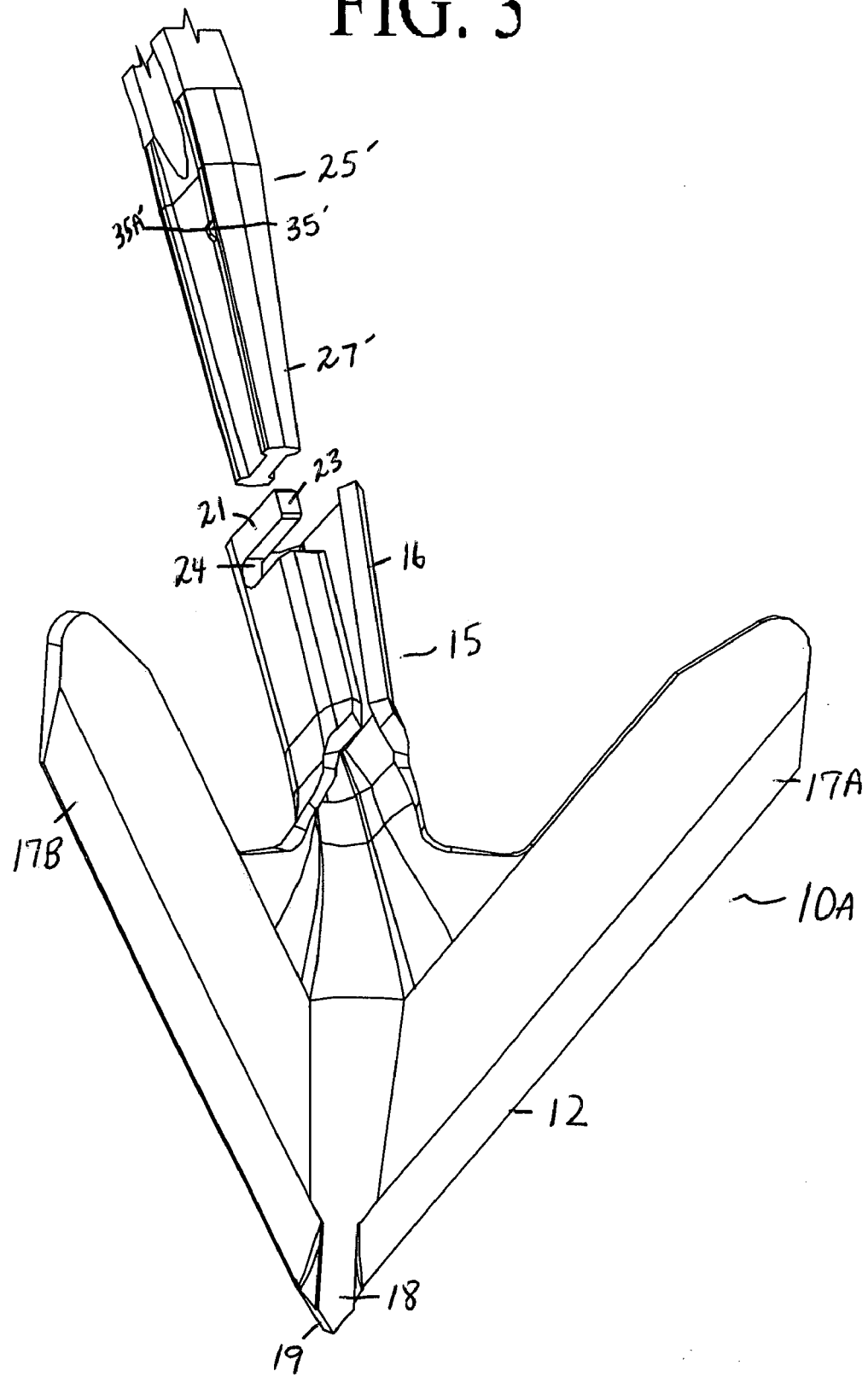
FIG. 3 is an exploded perspective view of a cultivator sweep assembly according to an alternate embodiment of the present invention.
Figure 4:
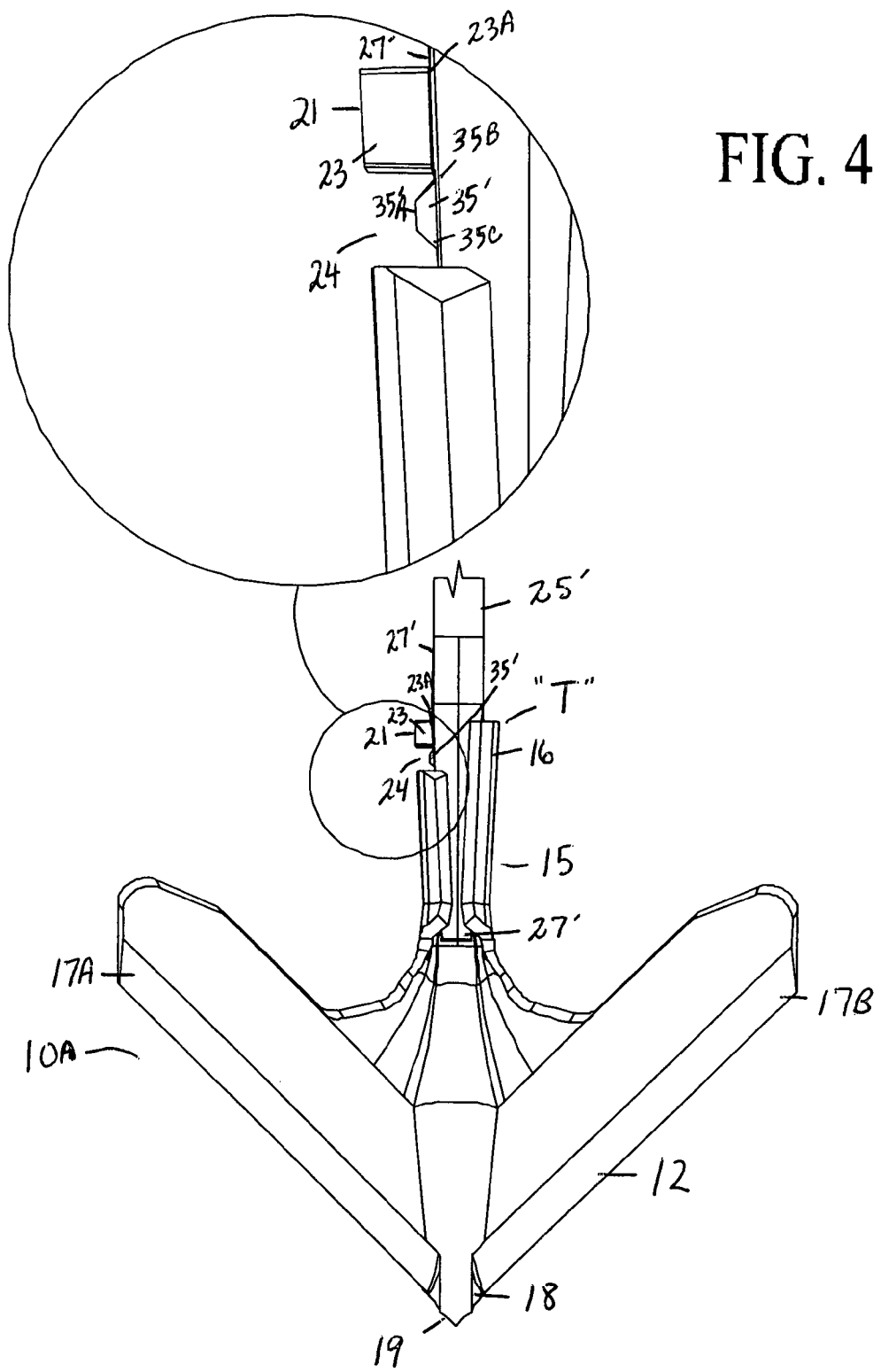
FIG. 4 is a side view of the cultivator sweep assembly of FIG. 3.

FIGS. 3-4 illustrate an alternate embodiment of the present invention. In particular, FIGS. 3-4 illustrate an alternate retaining means for releasably attaching and holding the sweep 10 and shank 25'.

As shown in FIGS. 3 and 4, the embodiments of sweep 10A are nearly identical to those described in the previous embodiment namely, the sweep 10A including the earth engaging head portion 12 formed integrally with the stem portion 15. The head portion 12 having the pair of substantially identical wings 17A and 17B symmetrically extending rearwardly from the nose portion 18 of the head portion 12, which nose portion 18 includes the forward most ground penetrating point 19. As described in the preferred embodiment, the top end (designated as "T" in FIG. 4) of the stem portion 15 having a narrow width of approximately 1¼ inches. The stem portion 15 defining the housing 16 shaped and proportioned to closely receive and engage a tapered end portion 27' of the shank 25'. The entire width of the sweep 10A from tip 17A to 17B is approximately 10 inches so the ratio of width of the stem portion 15 to the entire width of the sweep is 1¼ to 10 or 1:8. This is a narrow ratio of width for the stem portion 15 to the entire width of the sweep 10A.

In the alternate embodiment, a slot 24 forms a finger 21 on the upper right side of the stem 15. The finger 21 is integral to the sweep 10A. The thickness of the finger 21 can be manipulated in manufacturing to yield proper characteristics of a "leaf spring" known in the art. An end 23 of the finger 21 having a first position (as shown in FIG. 4) wherein an inner surface 23A is flush with surface 27' of the shank 25', and a second position where inner surface 23A is flush with a top end 35A' of the projection 35'. This allows the sweep 10A to be made from a single piece and the shank to be made from a single piece. There are no extra parts or pieces that tend to get clogged with dirt and lost or broken.

Once the projection 35' is received through the slot 24 of the stem portion 15 as will be further discussed, the end 23 of finger 21 returns to its first position. In this regard, the projection 35' is retained within the perimeter of the slot 24 thereby retaining the shank 25' within the housing 16.

The sweep 10A is held on to the shank 25' by the frictional engagement between the tapered end portion 27' of the shank 25' and the housing 16 of the stem portion 15 of the sweep 10A. As previously described, the sweep 10A is secondarily held on to the shank 25' as the projection 35' passes the finger 21 and is received through the slot 24 of the surface 22A of the housing 16. The projection 35' received through the slot 24 indicates that end portion 27' of the shank 25' is sufficiently received within the housing 16 of the stem portion 15 of the sweep 10A, and that the sweep 10A is mounted to the shank 25' with sufficient force.

The sweep 10A has a first position where the sweep 10A is received on the shank 25' but the projection 35' is outside the slot 24, a second position where the sweep 10A is received on the shank 25' and the finger 21 is on the top of the projection 35' and the third position where the sweep 10A is frictionally engaged with the shank 25' and the projection 35' is in the slot 24.

To remove the sweep 10A, strike the sweep 10A at top "T" and driving the end 23 of finger 21 downward, moving the end 23 of finger 21 outwardly, clearing projection 35'. As the end 23 moves further downward as discussed, the end 23 of finger 21 returns to its first position and shank 25' is slid outwardly from housing 16 of the stem portion 15 to remove sweep 10A from the shank 25'. The result is a simple two piece design, a one piece sweep and a one piece shank that provide frictional and locking hold and that provide a narrow stem portion to reduce dirt thrown by the stem and that provide a visual indicator of proper connection between the sweep and the shank.

Although the description above contains many specificities, these should not be construed as limiting the scope of the invention but as merely providing illustrations of some of the presently preferred embodiments of the invention. This invention thus described, it will be obvious that the same may be varied in many ways. Such variations are not to be regarded as a departure from the spirit and scope of the invention, and all such modifications as would be obvious to one skilled in the art are intended to be included within the scope of the present invention.

Thus the scope of the invention should be determined by the appended claims in the formal application and their legal equivalents, rather than by the examples given.

I claim:

1. A cultivator sweep assembly adapted for releasable attachment to a mobile agricultural apparatus, the sweep assembly comprising:
    a one piece sweep including a stem portion,
    a one piece shank having an end portion, said end portion including a surface and a projection having a top end,
    wherein the stem portion includes a housing for receipt of the end portion of the shank, said housing having opposing walls, and a side surface that defines a finger and a slot, said finger having an inner surface,
    said sweep having a first position wherein the inner surface of the finger is flush with the surface of the end portion, and a second position wherein the inner surface of the finger is flush with the top end of the projection.

2. The sweep assembly as recited in claim 1, wherein the stem portion having a narrow width of approximately 1¼ inches.

3. The sweep assembly as recited in claim 1, wherein the housing is shaped and proportioned to frictionally receive the tapered end portion of the shank.

4. The sweep assembly as recited in claim 1, wherein the projection is received through the slot of the housing for temporarily maintaining the shank within the housing of the sweep.

5. The sweep assembly as recited in claim 1, wherein as said sweep is driven onto said shank said finger flexes during movement of said sweep from said first position to said second position.

6. A sweep assembly as recited in claim 1, including a third position where said inner surface of the finger is flush with the surface of the end portion and the shank is in frictional engagement with the stem and the projection is also holding the sweep on the shank.

7. A cultivator sweep assembly adapted for releasable attachment to a mobile agricultural apparatus, the sweep assembly comprising:
    a one piece sweep including a stem portion,
    a shank having an end portion, said end portion including a surface and a projection on said surface having a top end,
    wherein the stem portion includes a housing for receipt of the end portion of the shank, said housing having opposing walls, and a side surface that defines a finger and a slot, said finger having an inner surface,
    said sweep having a first position wherein the finger is flush with the surface of the end portion, and a second position wherein the finger is flush with the top end of the projection and a third engaged position wherein said finger is again flush with the surface and said shank is frictionally engaged with said stem.

8. The sweep assembly as recited in claim 7, wherein when said sweep is in said third position said projection is visible in and locked in said slot.

9. The sweep assembly as recited in claim 8, wherein said projection includes ramps to aid in the installation of the sweep on the shank.

10. The sweep assembly as recited in claim 8, wherein the width of the stem to a total width of the sweep is in the ratio of approximately 1:8.

11. A cultivator assembly adapted for releasable attachment to a mobile agricultural apparatus, the cultivator assembly comprising:
    a one piece sweep including a stem portion,
    a shank having an end portion, said end portion including a surface and a projection integrally formed on said surface having a top end,
    wherein said stem portion includes a housing for receipt of the end portion of the shank, said housing having opposing walls, and a side surface that defines an integrally formed finger and a slot formed as part of the housing wall,
    said finger having an inner surface,
    said sweep having a first position wherein the finger is flush with the surface of the end portion, and a second position wherein the finger is flush with the top end of the projection and a third engaged position wherein said finger is again flush with the surface and said shank is frictionally engaged with said stem.

12. The cultivator assembly as recited in claim 11, wherein when said sweep is in said third position said projection is visible in said slot and locks said sweep to said shank.

13. The cultivator assembly as recited in claim 12, wherein said projection includes ramps to aid in the installation of the sweep on the shank and the removal of the sweep from the shank.

14. The sweep assembly as recited in claim 13, wherein the width of the stem to a total width of the sweep is in the ratio of approximately 1:8.

* * * * *